(12) United States Patent
Bentley

(10) Patent No.: US 6,544,038 B2
(45) Date of Patent: Apr. 8, 2003

(54) SYSTEMS AND METHODS FOR PRINTING CHARACTERS USING A TEMPLATE

(75) Inventor: Prudence Allen Bentley, Painted Post, NY (US)

(73) Assignee: Snowman Natural Learning, LLC, Atlanta, GA (US)

(*) Notice: Subject to any disclaimer, the term of this patent is extended or adjusted under 35 U.S.C. 154(b) by 0 days.

(21) Appl. No.: 09/785,034

(22) Filed: Feb. 16, 2001

(65) Prior Publication Data

US 2002/0115045 A1 Aug. 22, 2002

(51) Int. Cl.[7] .............................................. G09B 11/04
(52) U.S. Cl. ...................... 434/163; 434/117; 434/164; 283/45; 283/46
(58) Field of Search ........................ 434/170, 156–165

(56) References Cited

U.S. PATENT DOCUMENTS

| | | | | |
|---|---|---|---|---|
| 1,279,241 A | * | 9/1918 | Brouse | |
| 3,382,592 A | * | 5/1968 | Lucero | |
| 3,869,813 A | * | 3/1975 | Hancy | 35/37 |
| 4,170,833 A | * | 10/1979 | Quinn et al. | 35/36 |
| 4,173,082 A | * | 11/1979 | Niquette | 35/37 |
| 4,425,095 A | * | 1/1984 | Morris | 434/117 |
| 4,669,986 A | * | 6/1987 | Yokoyama | 434/64 |
| 4,838,792 A | * | 6/1989 | Hoyeck | 40/451 |
| 5,516,152 A | * | 5/1996 | Luna | 283/45 |
| 5,707,081 A | * | 1/1998 | Luna | 283/45 |
| 6,142,783 A | * | 11/2000 | Rocha | 434/162 |
| 6,259,013 B1 | * | 7/2001 | Walsh | 84/483.2 |

* cited by examiner

Primary Examiner—Derris H. Banks
Assistant Examiner—Jamila Williams
(74) Attorney, Agent, or Firm—Alston & Bird LLP

(57) ABSTRACT

A system and method for printing characters that is developmentally appropriate for children are disclosed. Specifically, the present invention introduces children to character shapes using the familiar shape of a snowman and through calisthenics that involve gross motor skills. When the children have become familiar with the shapes of the characters and the movements necessary to form the shapes, the method in accordance with an embodiment of the present invention teaches the children to use similar movements on a smaller scale to form the characters on writing paper.

3 Claims, 24 Drawing Sheets

SYSTEMS AND METHODS FOR PRINTING CHARACTERS USING A TEMPLATE

FIELD OF THE INVENTION

The invention generally relates to systems and methods for teaching how to form printed characters and introduces a new educational tool to aid instructors.

BACKGROUND OF THE INVENTION

The ability to form letters of the alphabet is a basic skill that is essential to any person's education. At present, two basic styles of manuscript writing are taught in schools. The traditional style of manuscript writing is commonly known as circle-and-stick or ball-and-stick writing. In the traditional style, letters are discontinuous, meaning that they are formed by separate pencil strokes. For example, in forming the lower case "a" the circle or ball shape is formed first; the pencil point is then lifted and a second stroke forms a straight vertical and contiguous line at the right of the circle. A problem with the traditional style is that the more times a beginning writer has to lift a pencil, the harder it becomes to make a legible letter. Further, children often have difficulty remembering on which side of the letter to place the stick. As a result, reversions in letter forms are common. The second style of writing in current use is commonly known as D'Nealian Manuscript writing. In D'Nealian writing, the number of times the pencil is lifted from the paper is reduced and, as a result, most of the letters are formed by a single, continuous pencil stroke.

While the two styles differ somewhat in appearance, there is little difference in the methods used to teach them. Practice writing pages feature model letters and words in dashed or shaded (light gray) form. Often there are small arrows or numbers that signal the order or direction of the pencil strokes and children are directed to trace the dashed or light gray letters and words. In essence, both methods enjoin young children as follows: copy (or trace) the model and practice, practice, practice. This requires fine motor skills that are only beginning to develop in young children. Because the requisite skills are not present, the methods are often developmentally inappropriate for use as the primary means of writing instruction.

Nonetheless, children are eager to learn to write and they need to learn if the goal of early literacy is to be accomplished. Therefore a developmentally appropriate method is required that founds instruction on known capabilities of preschool and primary age children.

SUMMARY OF THE INVENTION

A system and method for printing characters that is developmentally appropriate for children are provided by the present invention. Specifically, the present invention introduces children to character shapes using the familiar shape of a snowman and through calisthenics that involve gross motor skills. When the children have become familiar with the shapes of the characters and the movements necessary to form the shapes, the method in accordance with an embodiment of the present invention teaches the children to use similar movements on a smaller scale to form the characters on writing paper or other suitable media.

In accordance with an embodiment of the present invention, a method for teaching manuscript writing to a person is disclosed wherein a character of the alphabet, having a shape and letter path is presented, the person is introduced to the letter path of the character by having the person form the shape of the character in the air by following the letter path of the character with at least a portion of their body, and the person is instructed to form the shape of the character on a writing paper by following the letter path of the character with a writing instrument.

In accordance with another embodiment of the present invention, a method is disclosed wherein the step of presenting a character of the alphabet comprises introducing a model of a snowman, wherein at least a portion of the shape of the character is superimposed on the model of the snowman.

In accordance with another embodiment of the present invention, a method is disclosed wherein the step of presenting a character of the alphabet comprises introducing a model of a snowman, wherein the model contains one or more reference points.

In accordance with another embodiment of the present invention, a method is disclosed wherein the step of instructing the person to form the shape of the character on a writing paper comprises providing the person with a writing paper that contains a template of a snowman and instructing the person to follow the letter path of the character on at least a portion of the template.

In accordance with another embodiment of the present invention, a method for teaching at least one person to form a letter of the alphabet is disclosed wherein a template is provided that includes a plurality of parallel lines, wherein each of the parallel lines are separated from an adjacent parallel line by a width portion, and a plurality of circles, wherein at least one circle is disposed in each width portion; and the person is instructed to form a letter that conforms to at least a portion of the template.

In accordance with another embodiment of the present invention, a writing template for teaching manuscript writing is disclosed that includes a plurality of parallel lines spaced at equidistant intervals and a plurality of circles with at least one circle disposed in each of the equidistant intervals.

BRIEF DESCRIPTION OF THE DRAWINGS

Figure 1:
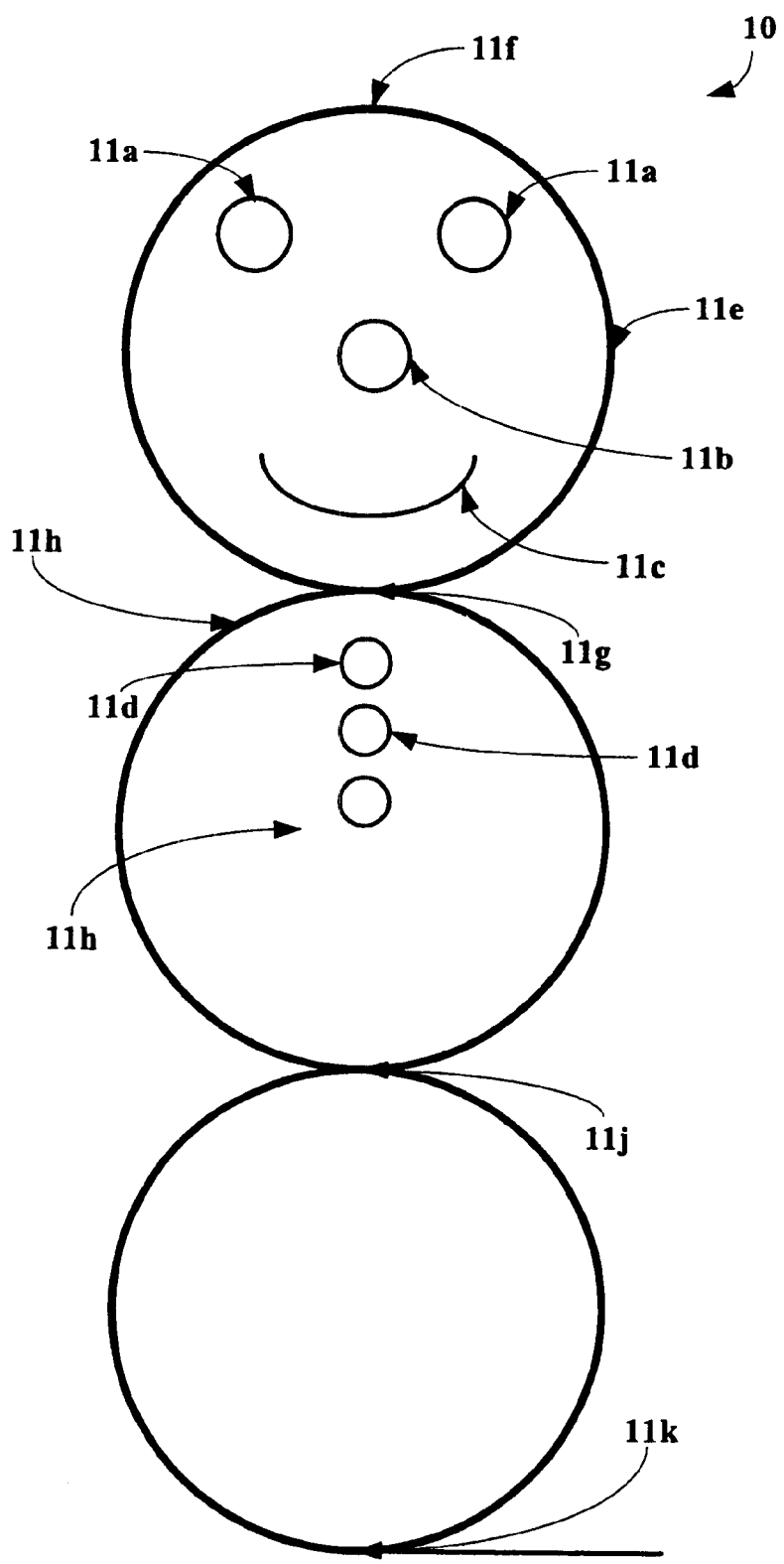

Having thus described the invention in general terms, reference will now be made to the accompanying drawings, which are not necessarily drawn to scale, and wherein:

FIG. 1 is an illustration of a snowman model in accordance with an embodiment of the present invention.

Figure 2A:
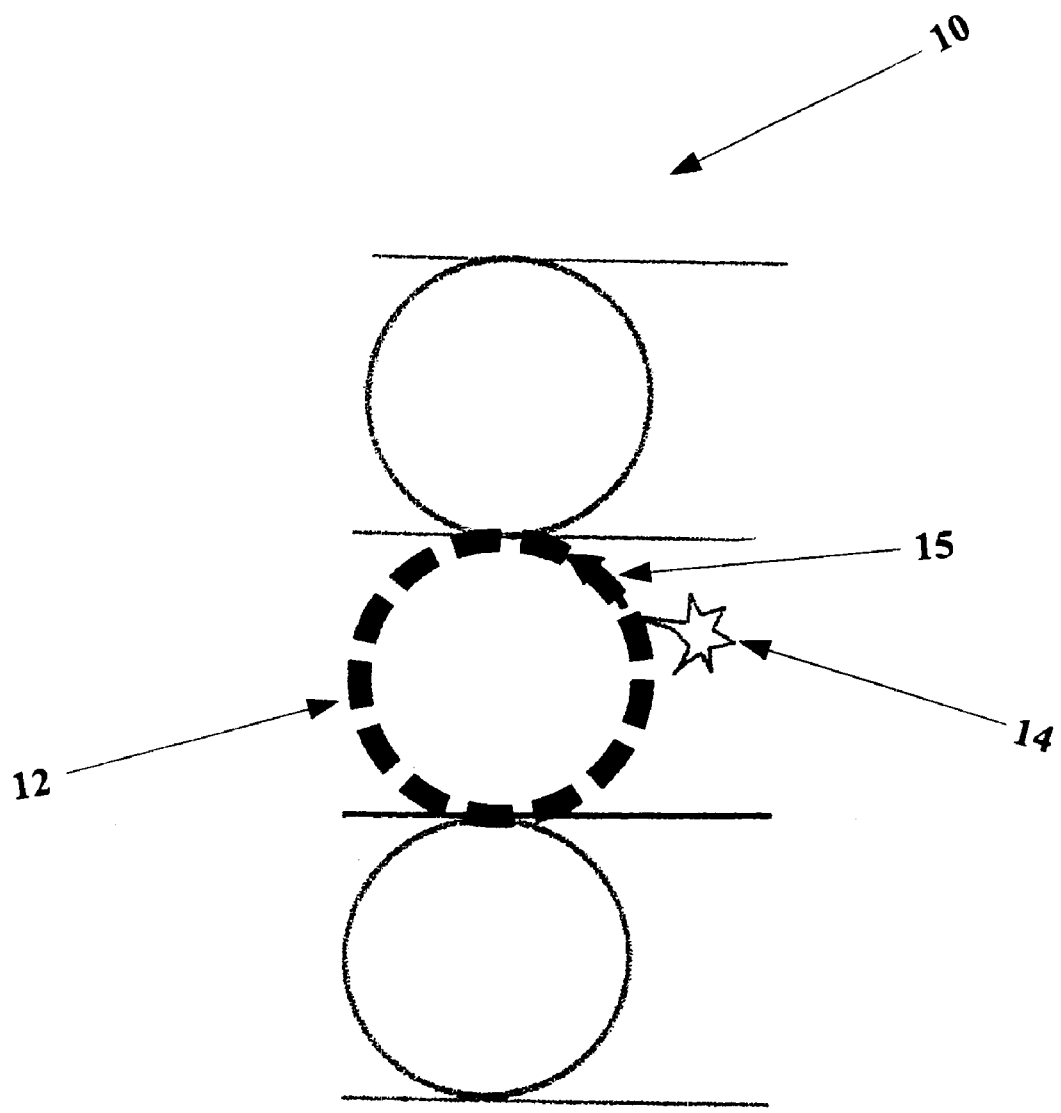
Figure 2B:
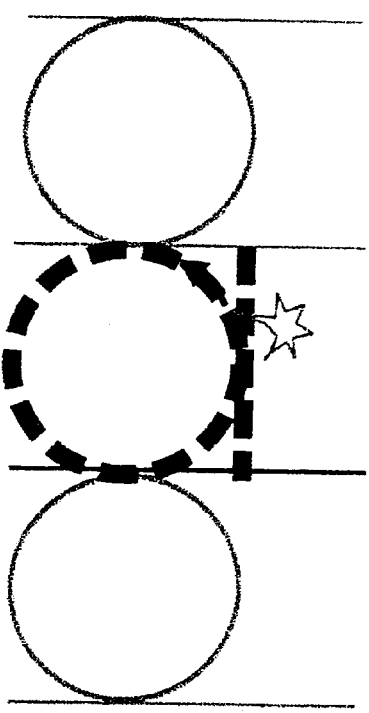
Figure 2C:
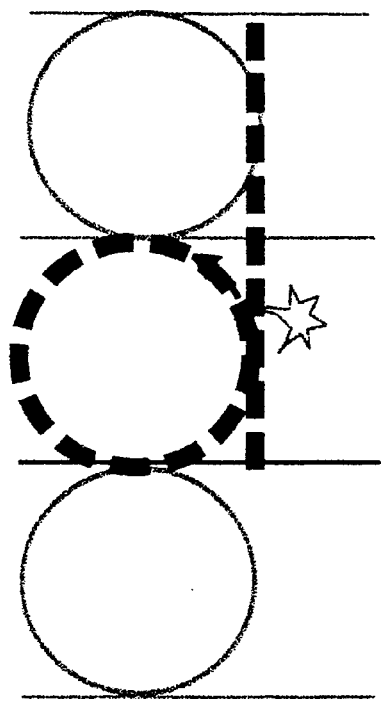
Figure 2D:
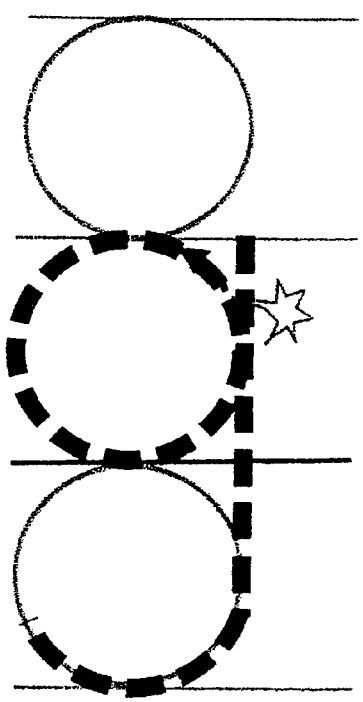
Figure 2E:
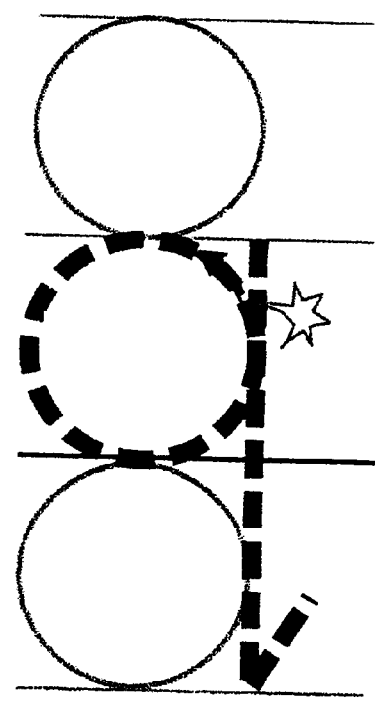
Figure 2F:
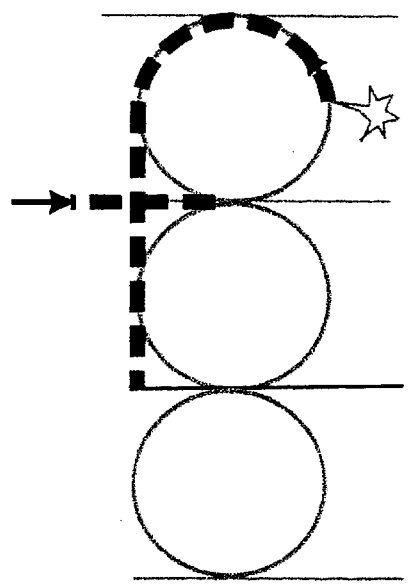
Figure 2G:
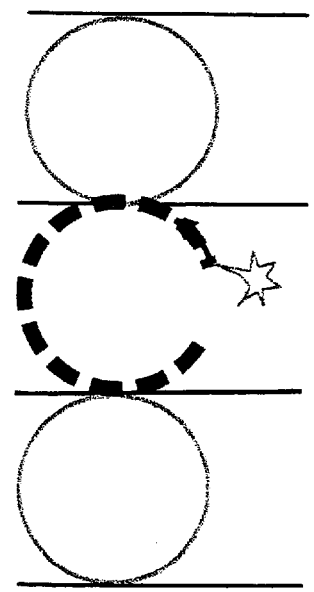
Figure 2H:
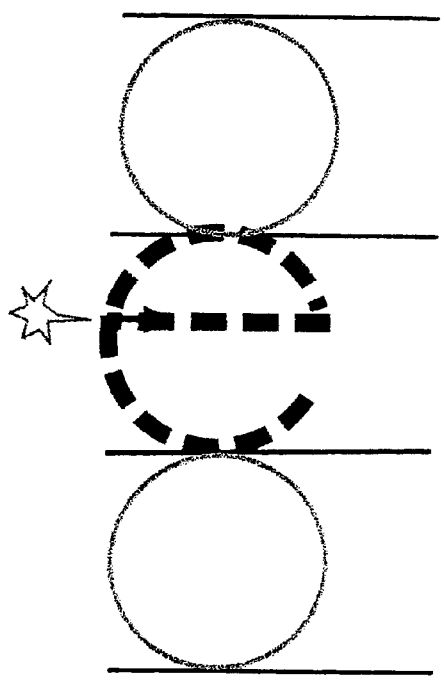
Figure 2I:
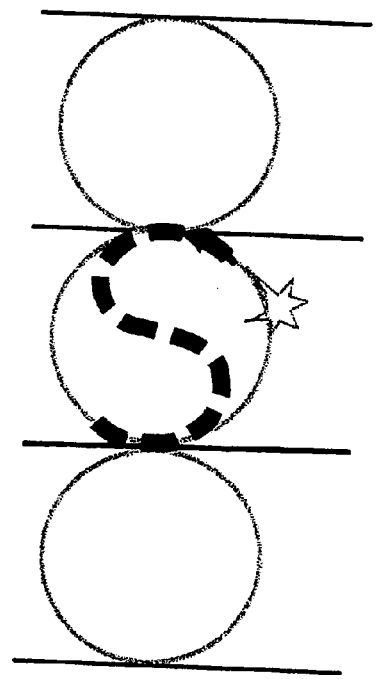
Figure 2J:
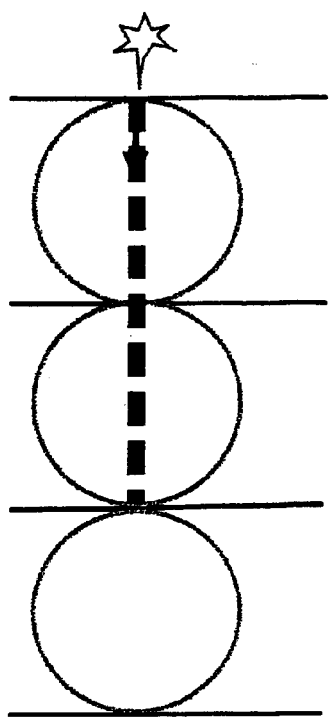
Figure 2K:
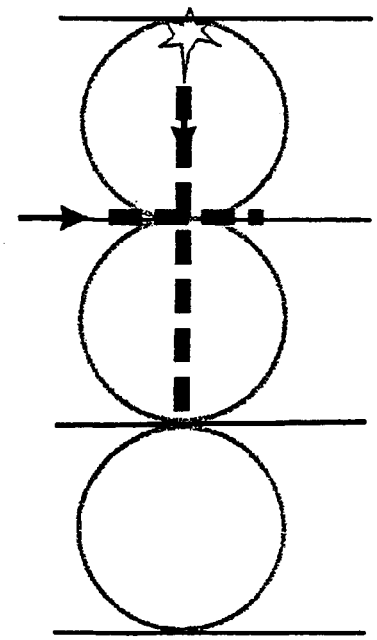
Figure 2L:
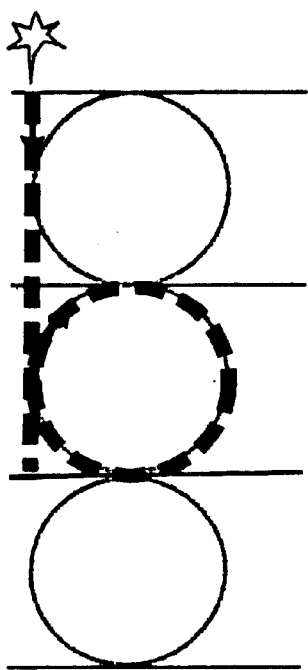
Figure 2M:
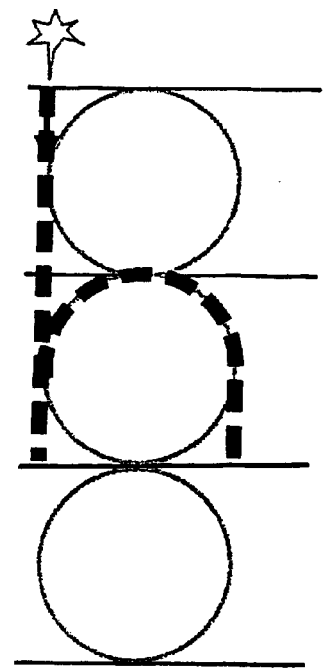
Figure 2N:
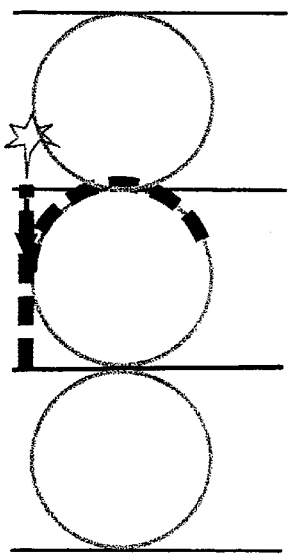
Figure 2O:
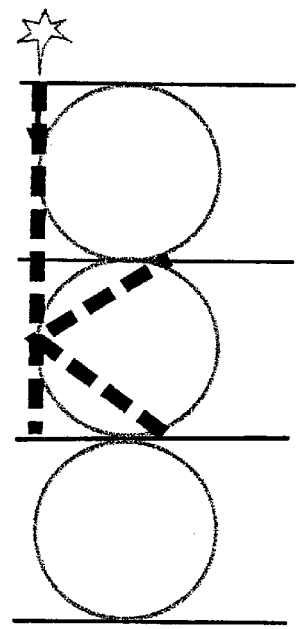
Figure 2P:
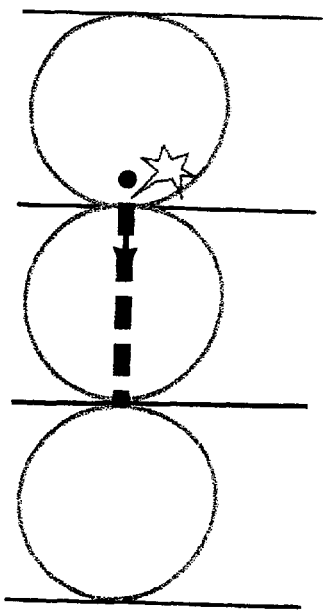
Figure 2Q:
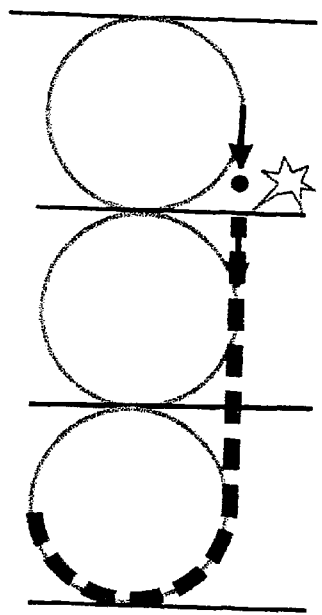
Figure 2R:
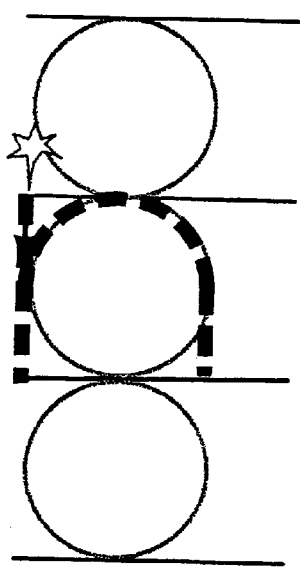
Figure 2S:
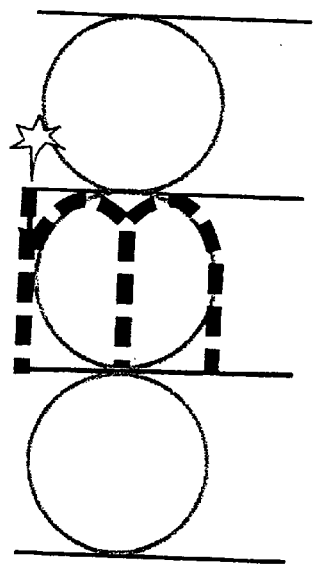
Figure 2T:
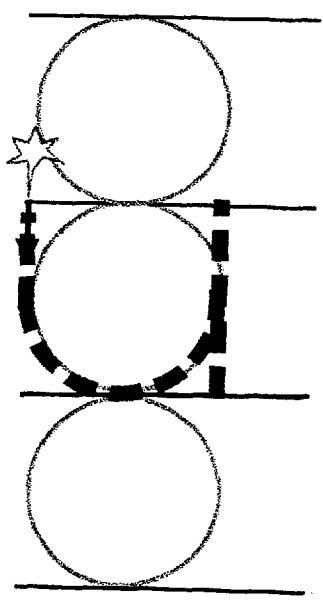
Figure 2U:
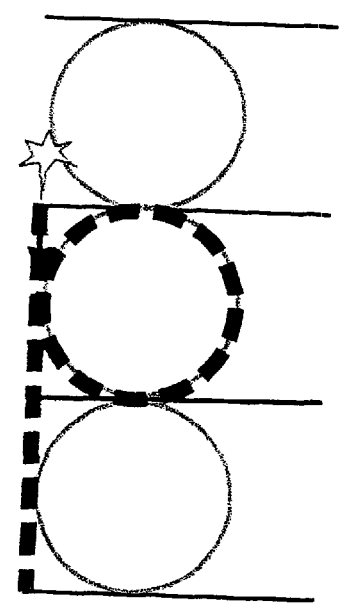
Figure 2V:
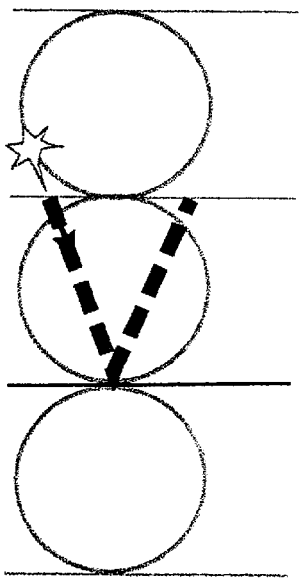
Figure 2W:
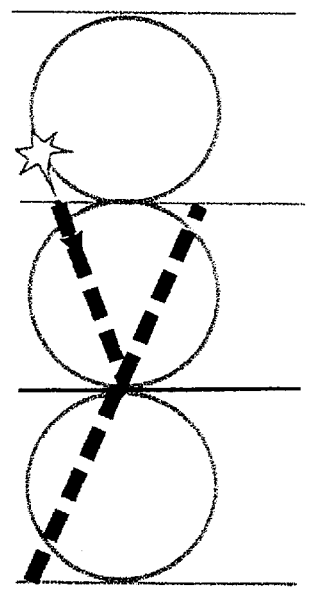
Figure 2X:
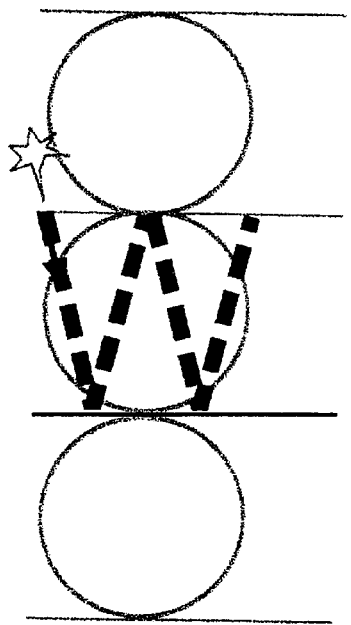
Figure 2Y:
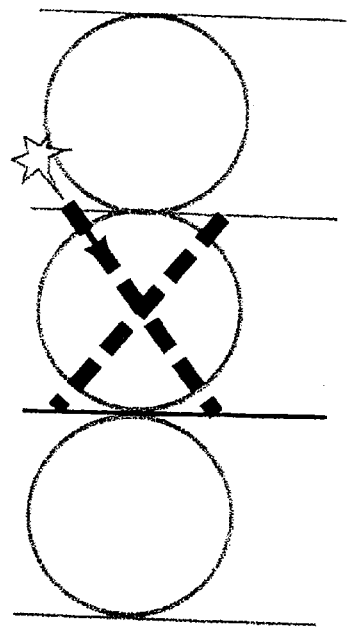
Figure 2Z:
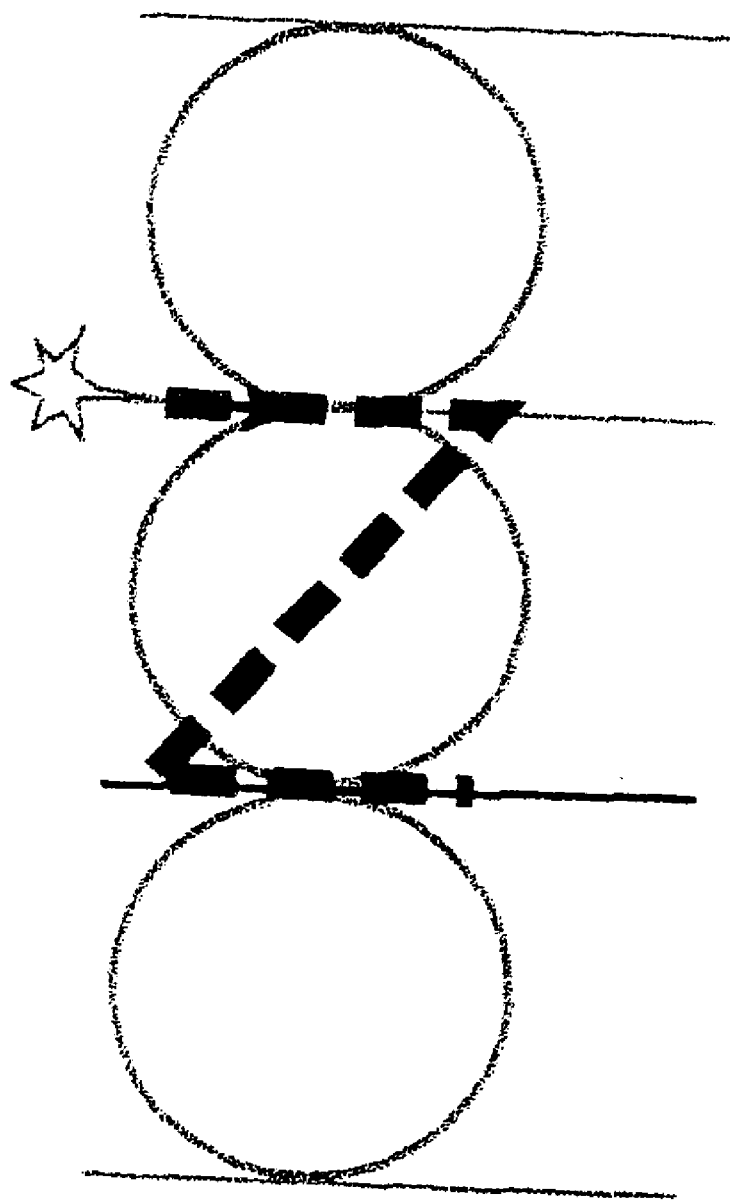

FIGS. 2A–2Z illustrate a method in accordance with an embodiment of the present invention for displaying lower case letters on a snowman model.

Figure 3A:
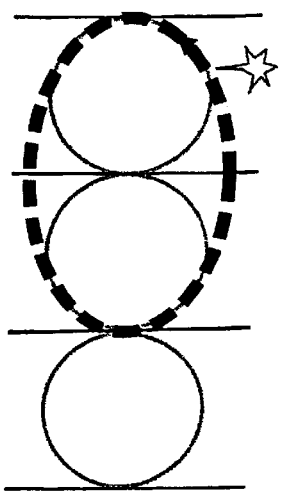
Figure 3B:
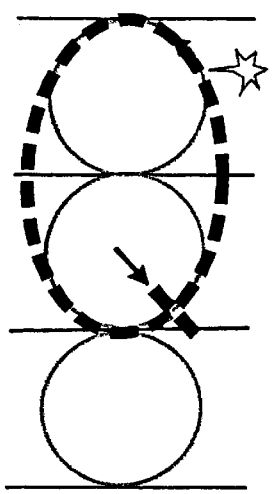
Figure 3C:
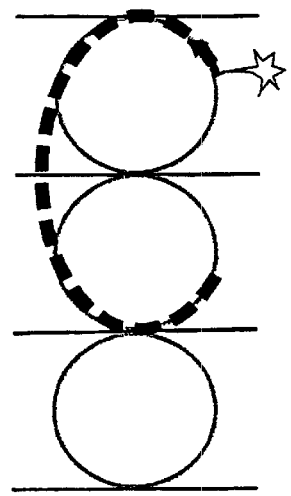
Figure 3D:
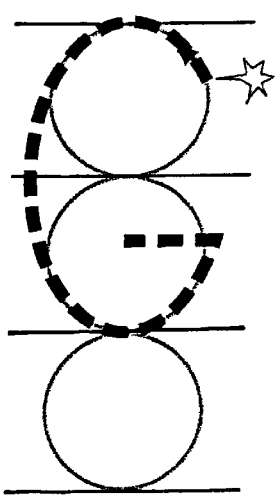
Figure 3E:
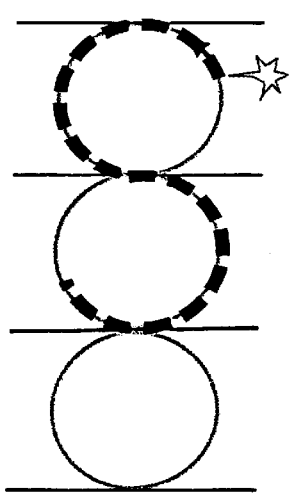
Figure 3F:
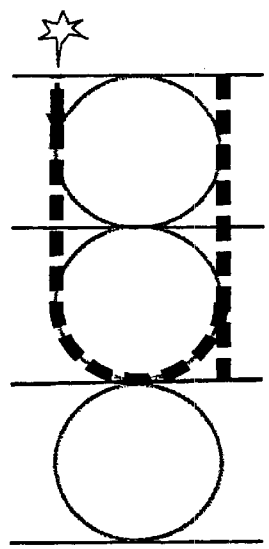
Figure 3G:
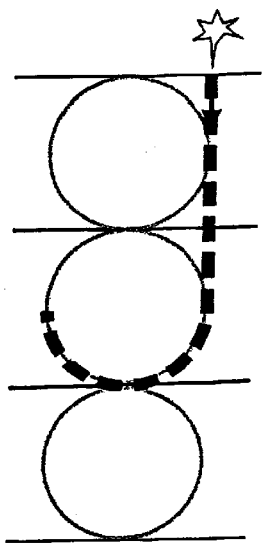
Figure 3H:
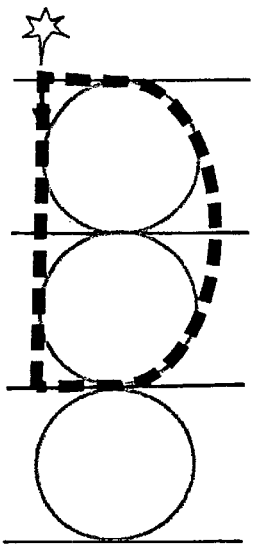
Figure 3I:
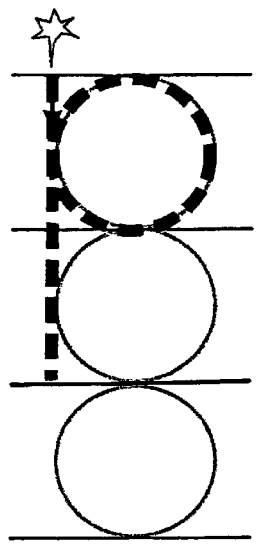
Figure 3J:
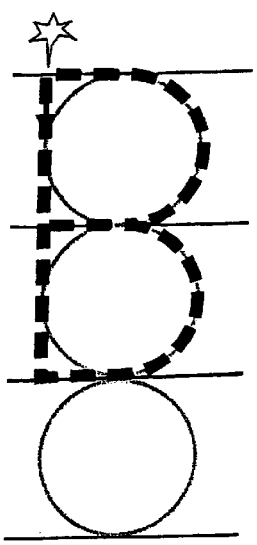
Figure 3K:
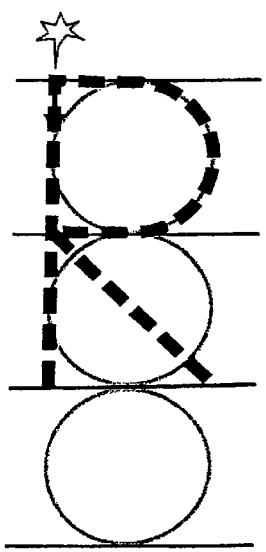
Figure 3L:
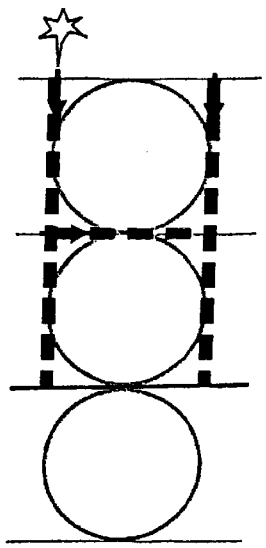
Figure 3M:
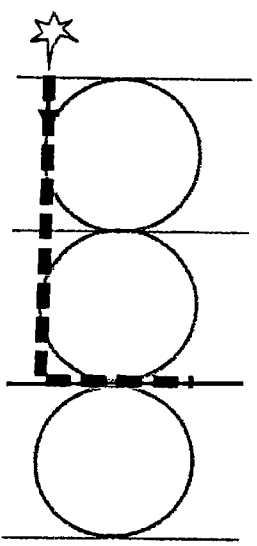
Figure 3N:
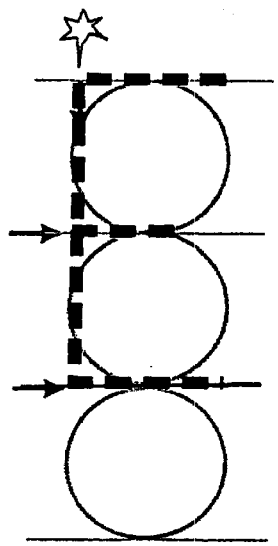
Figure 3O:
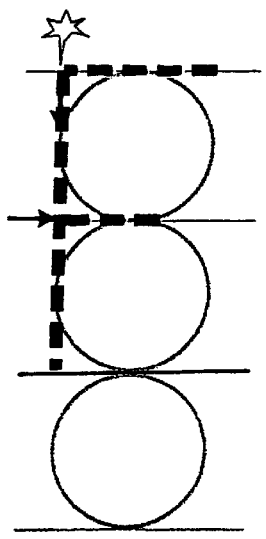
Figure 3P:
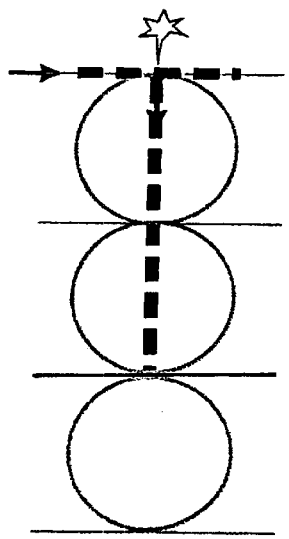
Figure 3Q:
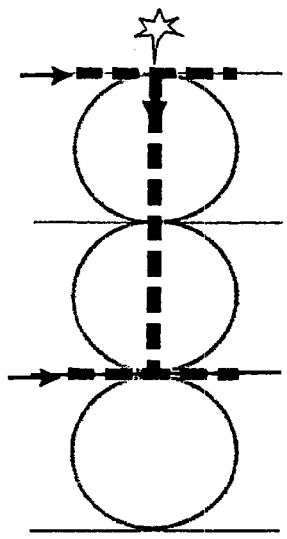
Figure 3R:
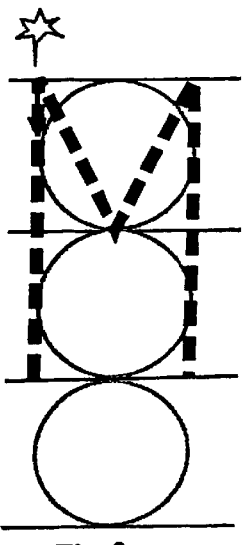
Figure 3S:
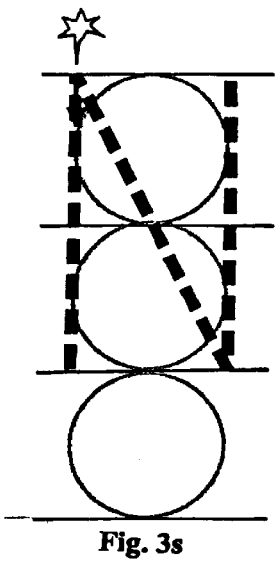
Figure 3T:
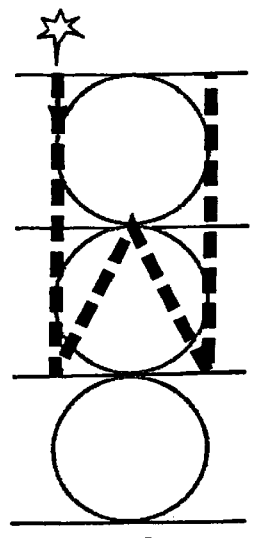
Figure 3U:
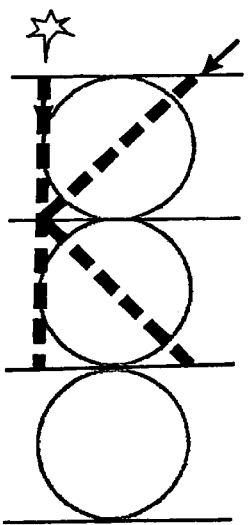
Figure 3V:
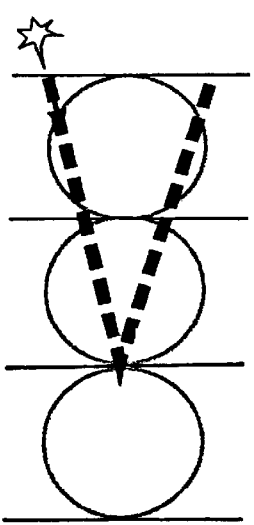
Figure 3W:
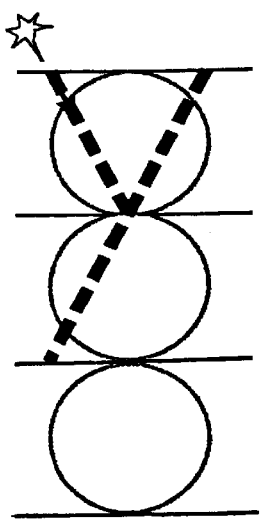
Figure 3X:
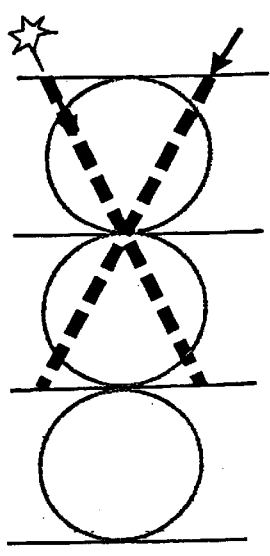
Figure 3Y:
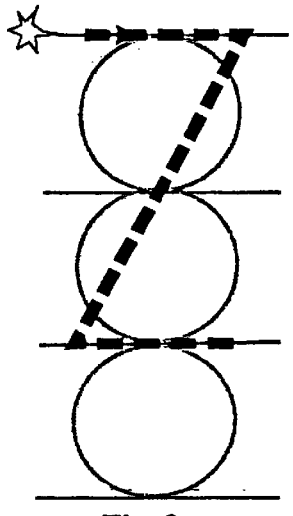
Figure 3Z:
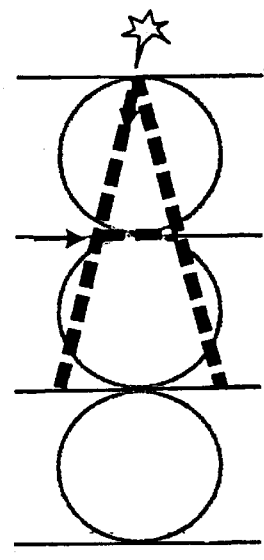
Figure 4A:
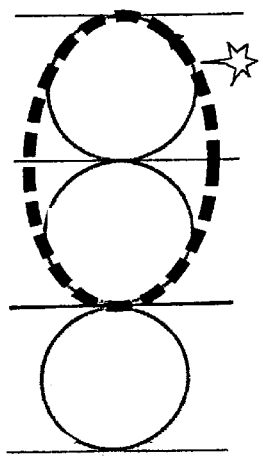
Figure 4B:
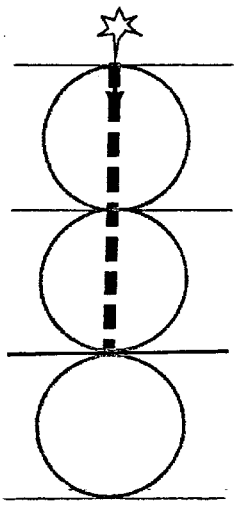
Figure 4C:
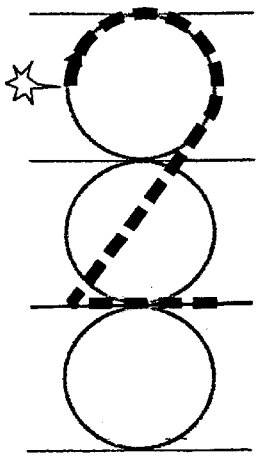
Figure 4D:
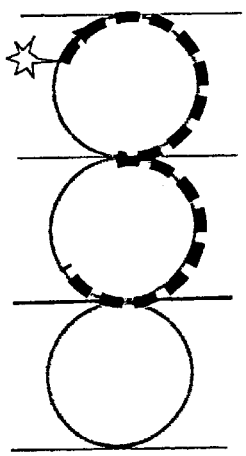
Figure 4E:
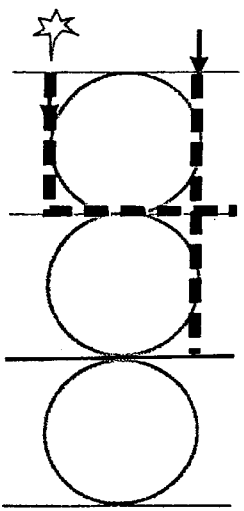
Figure 4F:
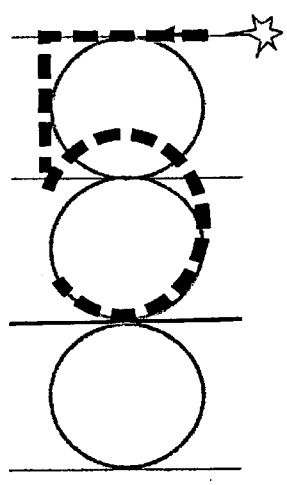
Figure 4G:
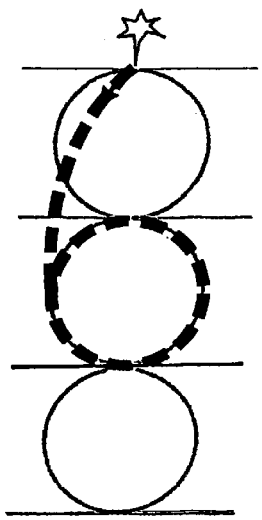
Figure 4H:
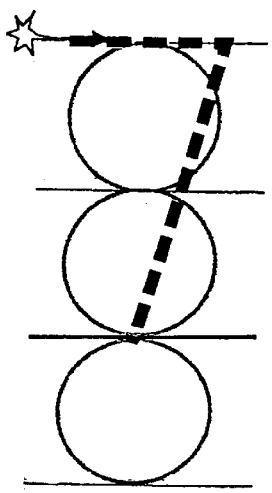
Figure 4I:
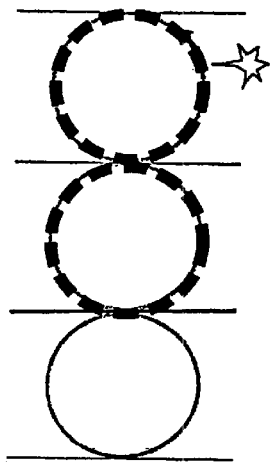
Figure 4J:
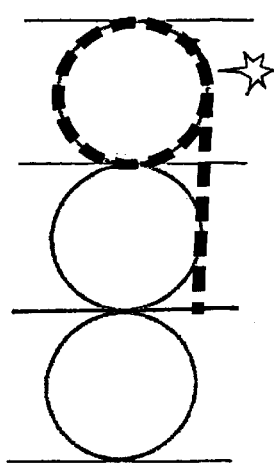

FIGS. 3A–3Z illustrate a method in accordance with an embodiment of the present invention for displaying lower case letters on a snowman model.

FIGS. 4A–4J illustrate a method in accordance with an embodiment of the present invention for displaying the numeric characters 0 through 9 on a snowman model.

Figure 5:
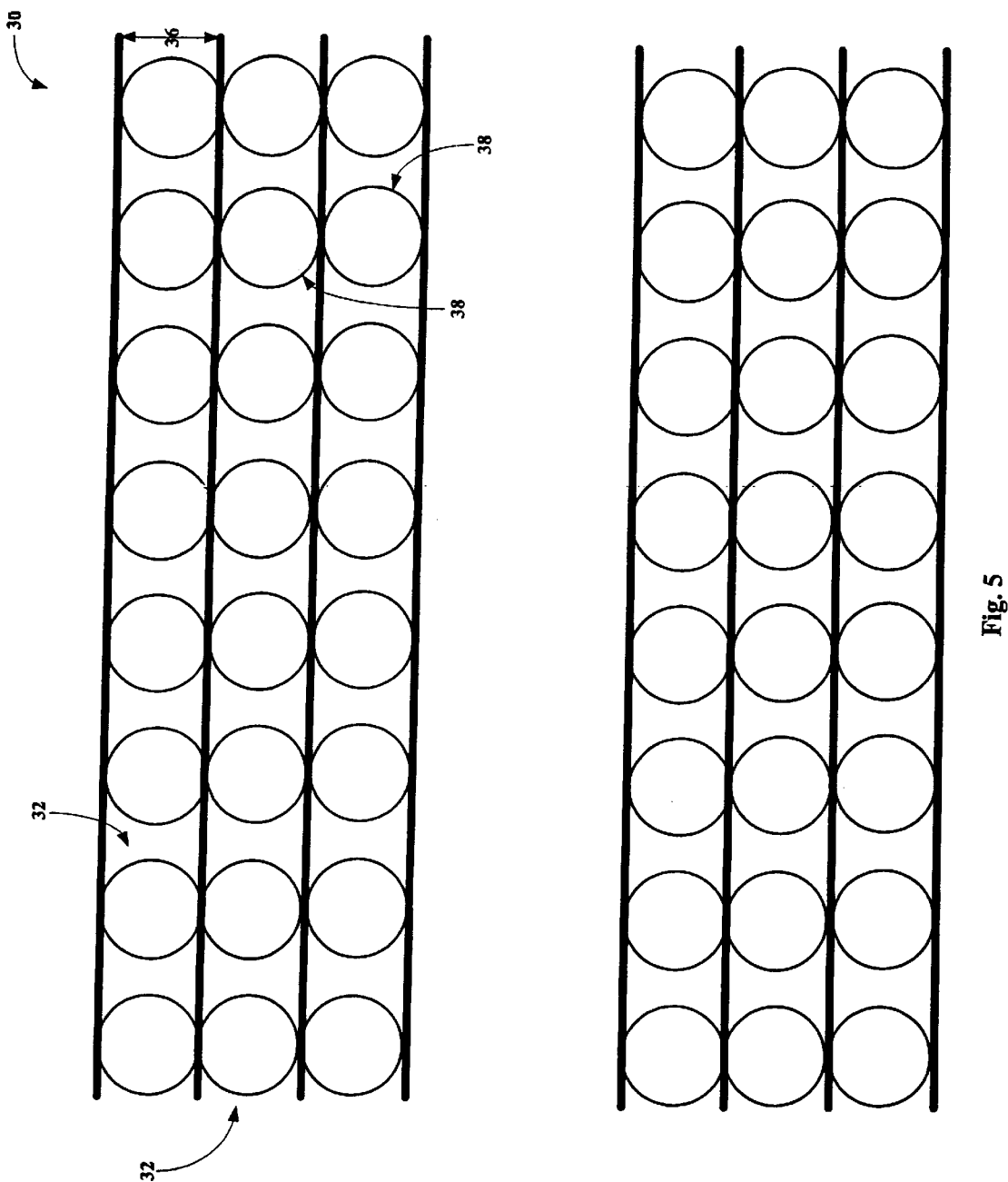

FIG. 5 illustrates a snowman writing paper in accordance with an embodiment of the present invention.

Figure 6:
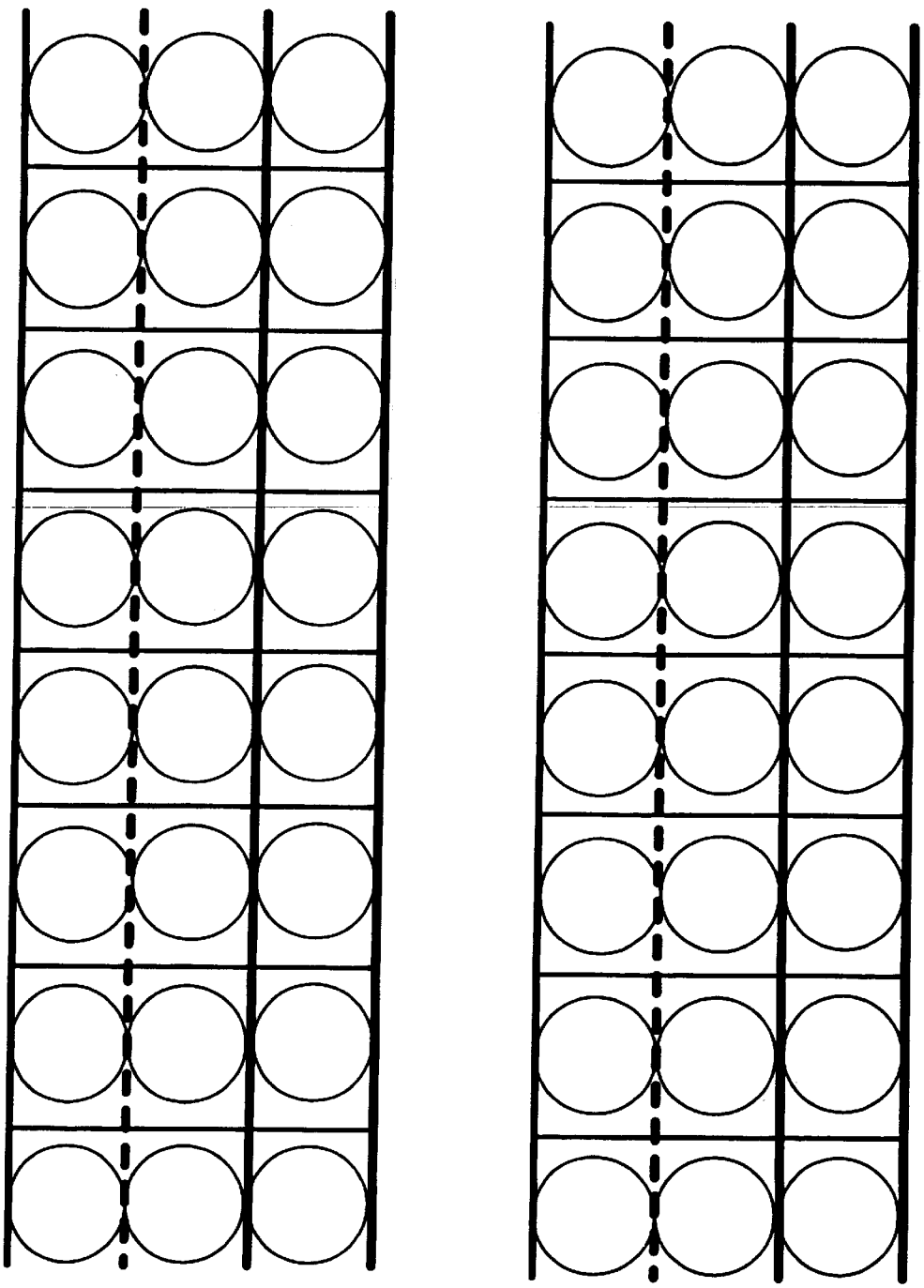

FIG. 6 illustrates another snowman writing paper in accordance with an alternate embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The following paragraphs describe an embodiment of the present invention that the inventor has entitled the snowman writing technique. The technique teaches a child to write by using the child's own body knowledge and by introducing letterforms through broad action schemes, known as snowman calisthenics, that use the gross motor skills of the child. Unlike the writing techniques known in the prior art, snowman writing uses actions that are developmentally appropriate for children. Much of the embodiment described herein uses children as an example, but it will be readily apparent to one of ordinary skill in the art that the present invention can be used with students of any age.

Once the child has been introduced to letters and has formed the letters through. snowman calisthenics, the emphasis shifts to the fine motor skill development and actual writing practice is introduced through a template known herein as snowman writing paper.

Snowman Calisthenics

The following paragraphs describe the use of the broad action schemes known as snowman calisthenics to introduce a person to the letters of the alphabet in accordance with an embodiment of the present invention.

Snowman calisthenics are a series of exercises designed to guide a child's attention as he or she learns the shapes of letters of the alphabet. At first, the child is taught to trace letter paths using their entire body, especially the hands and arms. Later, the large movements are scaled down and performed on writing paper with one hand as the child learns to write. The shift from two-handed, larger movements to one-handed, smaller movements presents no problem because all letter paths have previously been practiced using both hands simultaneously.

In an embodiment of the present invention, a teacher begins the snowman calisthenics by introducing students to a large snowman model. In the described embodiment, the snowman model is a physical model made of cardboard or other similar material, but one of ordinary skill in the art will readily recognize that the presentation of the basic snowman shape could be via a drawing, an overhead, a computer or other media. FIG. 1 shows an illustrative snowman model 10 that comprises three circles aligned end-to-end along a vertical axis. The model 10 shown in FIG. 1 is relatively simple; it includes eyes 11a, a nose 11b, a mouth 11c, buttons 11d, head 11e, top of the head 11f, neckline 11g, shoulders 11h, chest 11i, waist 11j and ground 11k. Additional features, as desired, may be added to this basic model 10 to help the students associate the parts of the model with their own bodies. The disclosed features (and such other features as are added) establish points of reference that the students use later when they practice forming letters.

A snowman figure is advantageous: (a) because children easily recognize manifest regularities in the form and structure of this simple shape and (b) because there are manifest similarities between snowman circles and many lower case manuscript letters. In addition, children readily grasp the comparisons of the reference points on their bodies and the corresponding reference point on the model 10.

In an embodiment of the present invention, a common set of reference points is named and defined as the teacher (sometimes referred to herein as the coach) names and identifies significant reference points. The coach does this by first locating the reference point on his or her own body and then indicating the corresponding location on the snowman model 10. Children are then prompted to repeat these actions by locating the reference points on their bodies and pointing to the reference points on the snowman model 10. In addition, the coach may label each reference point and have the children repeat the label, as each reference point is located. In a preferred embodiment, reference points include the eyes 11a, a nose 11b, a mouth 11c, buttons 11d, head 11e, top of the head 11f, neckline 11g, shoulders 11h, chest 11i, waist 11j and ground 11k.

This process of labeling and identifying reference points serves the important purpose of focusing the children's attention as they learn to impose structure on the abstract graphic of the snowman model 10. Moreover the process prepares children for the next step in snowman calisthenics and the introduction of characters to the model 10. Next, the letters of the alphabet are introduced one at a time. Each letter is introduced by displaying the letter on the snowman model 10 such that at least a portion of the shape of the letter is superimposed on the body of the snowman. FIGS. 2A through 2Z show the placement of lower case letters on the model 10 and FIGS. 3A through 3Z show the placement of upper case letters on the model 10. In addition, in an alternate embodiment, the writing technique described herein can also be used to teach numeric characters and FIGS. 4A through 4J show the placement of numeric characters 0 through 9 on the model 10.

In the preferred embodiment, the initial introduction of letters should be limited to lower case letters. Lower case letters are generally considered more essential to reading and conventional writing. And children traditionally encounter more difficulty learning lower case letters. The same basic procedures disclosed herein apply to the instruction on upper case letters; however, in the preferred embodiment, instruction on upper case letters is deferred until after lower case letters have been introduced. For this reason, the following paragraphs describe the invention with primary reference FIGS. 2A through 2Z.

The order of presentation shown in FIGS. 2A through 2Z is an order of presentation of an embodiment of the present invention. This letter order groups letters based on similarities in starting points and direction of letter paths. It also conforms to the natural manner of learning and helps minimize the potential for confusion or frustration. Having said that, the disclosed order of presentation is intended to be illustrative as it will be readily apparent to one of ordinary skill in the art that alternate orders of presentation are possible.

The following paragraphs describe certain elements that are common to every character in FIGS. 2, 3 and 4. For the sake of simplicity and to avoid redundancy, the following description is limited to FIG. 2A.

In FIG. 2A, a lower case letter "o" 12 is superimposed on a snowman model 10. A snowflake 14 and arrow 15 are disposed adjacent the snowman model 10 and represent the starting point and direction of the letter path, respectively.

In the disclosed embodiment, a teacher begins snowman calisthenics by displaying a snowman model 10 with a letter superimposed on it. The teacher then asks the students, "Where does the letter path start?" The students respond "There!" and simultaneously thrust out both arms with fists lightly clenched together to point to the snowflake 14 as the starting point of the letter path. The teacher then guides the students through the process of forming the letter 12 as he or she speaks the letter path instructions 16. The children move their outstretched arms in accordance with the letter path instructions 16 and, in so doing, form the letter in the air. In a preferred embodiment, the letter path instructions 16 disclosed in the figures are geared to children and use only two basic movements, push and pull. The rest of the words in the letter path instructions 16 merely define the direction of movement. The words push and pull help children as they graduate from snowman calisthenics and begin to write on paper. Children write on paper with more confidence and competence when they call to mind the large motor coordinations of push and pull and use these words themselves as their hands guide and direct the movement of their writing instrument.

As an example, the letter path of the lower case letter "o" of FIG. 2A begins at the snowflake 14 and starts in the direction indicated by the arrow 15. In response to the teacher's instruction to "Push up and over" the students move their outstretched arms in a counterclockwise circular movement. When the students' arms reach an approximate 10 o'clock position, the teacher continues by saying "pull down and around." The children continue the counterclockwise circular movement until their arms reach an approximate 5 o'clock position. The teacher then completes the letter path instruction for this letter by saying "push up and close the path" wherein the students continue the counterclockwise circular movement until their arms reach the starting position.

The physical interaction involved in snowman calisthenics illustrates the holistic approach of this technique in teaching children the structure and form of letters. Children first see the letter as a whole and then move their hands and arms along the letter path to form the letter. In a preferred embodiment, the children move only their hands and arms; their torsos remain erect during the movement.

Each letter involves a unique letter path and with attentive repetition the children internalize the requisite action scheme for each letter. Because the children have used two hands to form each letter, they experience the difference between right and left, clockwise and counter-clockwise as they reach across their bodies to form the letter. Over time the action schemes function as reference structures in a child's thought system which, in the early years, is funded primarily by physical interactions with the child's environment. The use of gross motor skills when introducing children to letter shapes thus creates a valuable cognitive resource. Moreover, the physical activity involved in Snowman calisthenics, and the benefits derived therefrom, are in sharp contrast to the writing techniques of the prior art that focus exclusively on fine motor skill activities.

Snowman Writing

Once the child has been introduced to letters and has formed the letters through snowman calisthenics, the emphasis of the Snowman Writing Technique shifts to the fine motor skill development and actual writing practice is introduced through snowman writing paper.

FIG. 5 illustrates snowman writing paper 30 in accordance with an embodiment of the present invention. The figure shows two sets of snowman writing templates 32. Each template 32 includes four parallel lines 34 spaced at substantially equidistant intervals, such that each of the parallel lines is separated from an adjacent parallel line by a width portion 36. A circle 38 is disposed in each of the three width portions 36 that lie between pairs of parallel lines and the circles 38 are aligned end-to-end along the vertical axis and form a snowman figure.

In FIG. 5, the third parallel line from the top is darker than or otherwise distinguishable from the other three parallel lines. This optional distinction is added to provide a border for the bottom edge of the majority of letters of the alphabet. Similarly, in an alternate embodiment of the snowman writing paper shown in FIG. 6, the second parallel line from the top is a dashed line and serves as a border for the top of many lower case letters of the alphabet as well as the midline for a number of upper case letters. These figures are intended to be illustrative; similar modifications to the snowman writing paper will be readily apparent to one of ordinary skill in the art.

As explained above, students' first introduction to letters and their first attempts to follow the letter paths to form letters occur on a large scale. The scale on which the snowman calisthenics are performed is reduced, as the students grow adept at forming letters. At the teacher's discretion, snowman writing paper 30 and writing tools are presented to the students and the snowman calisthenics are repeated. This time, however, students use the writing tool and form the letters on the snowman writing templates 32 rather that using their arms to form the letters in the air. In a preferred embodiment, the teacher demonstrates each of the letter paths on a blackboard or similar media and then repeats the letter path instructions as the students attempt to follow the letter paths using the writing tools. Having already experienced the letter paths using their large muscles, students are better equipped to hone the fine motor skills required for manuscript writing In concluding the detailed description, it should be noted that it will be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts, and equivalents of all means or step-plus function elements are intended to include any structure, materials or acts for performing their cited functions.

That which is claimed:

1. A writing template for a person to form a shape of a character, comprising:

four parallel lines spaced at equidistant intervals; and a circle disposed in each of the equidistant intervals such that at least a portion of each circle is used to form the shape of the character;

wherein the circles disposed in each of the three equidistant intervals are aligned end-to-end along a vertical axis to form a snowman figure.

2. A writing template for teaching manuscript writing, the writing template consisting of:

four parallel lines, wherein each of the parallel lines is separated by a width portion; and a circle disposed in each of the width portions;

wherein the circles are aligned end-to-end along a vertical axis to form a snowman figure.

3. A template used to form a letter of the alphabet, the template comprising:

three circles aligned end-to-end along a vertical axis, wherein at least a portion of each of the three circles is used to form a shape of the letter.

\* \* \* \* \*